United States Patent
Lin et al.

(10) Patent No.: US 9,904,837 B2
(45) Date of Patent: Feb. 27, 2018

(54) TOUCH DEVICE WITH FINGERPRINT IDENTIFICATION FUNCTION

(71) Applicant: Key Application Technology Co., LTD., Zhudong Township, Hsinchu County (TW)

(72) Inventors: Wei-Cheng Lin, Zhudong Township, Hsinchu County (TW); Chien-Jen Hsiao, Zhudong Township, Hsinchu County (TW); Shih-Hsiu Tseng, Zhudong Township, Hsinchu County (TW)

(73) Assignee: Keycore Technology Corp., Hsinchu County (TW)

( * ) Notice: Subject to any disclaimer, the term of this patent is extended or adjusted under 35 U.S.C. 154(b) by 182 days.

(21) Appl. No.: 14/957,603

(22) Filed: Dec. 3, 2015

(65) Prior Publication Data
US 2017/0161535 A1    Jun. 8, 2017

(51) Int. Cl.
*G06K 9/00* (2006.01)
*G06F 3/044* (2006.01)
*G06F 3/041* (2006.01)

(52) U.S. Cl.
CPC .......... *G06K 9/0002* (2013.01); *G06F 3/044* (2013.01); *G06F 3/0416* (2013.01); *G06K 9/00013* (2013.01)

(58) Field of Classification Search
None
See application file for complete search history.

(56) References Cited

U.S. PATENT DOCUMENTS

| | | | |
|---|---|---|---|
| 9,158,958 B2* | 10/2015 | Wickboldt | G06K 9/00026 |
| 2010/0245283 A1* | 9/2010 | Lee | G06F 3/0416 |
| | | | 345/174 |
| 2014/0078701 A1* | 3/2014 | Tanabe | H01L 51/5246 |
| | | | 361/760 |
| 2015/0029135 A1* | 1/2015 | Han | G06F 3/0412 |
| | | | 345/174 |

* cited by examiner

*Primary Examiner* — Seokyun Moon
(74) *Attorney, Agent, or Firm* — Nikolai & Mersereau, P.A.; C. G. Mersereau

(57) ABSTRACT

A touch device with fingerprint identification function includes a touch unit and a fingerprint identification unit. The touch unit has a touch section and a non-touch section. The non-touch section is disposed around the touch section in adjacency to the touch section. The fingerprint identification unit is disposed on the non-touch section of the touch unit. The fingerprint identification unit is integrated with the touch unit. Therefore, it is unnecessary to additionally form a perforation or a channel on the touch device for arranging the fingerprint identification unit as in the conventional touch device. In this case, the structural strength of the touch device will not be deteriorated. Also, the manufacturing cost can be lowered.

3 Claims, 6 Drawing Sheets

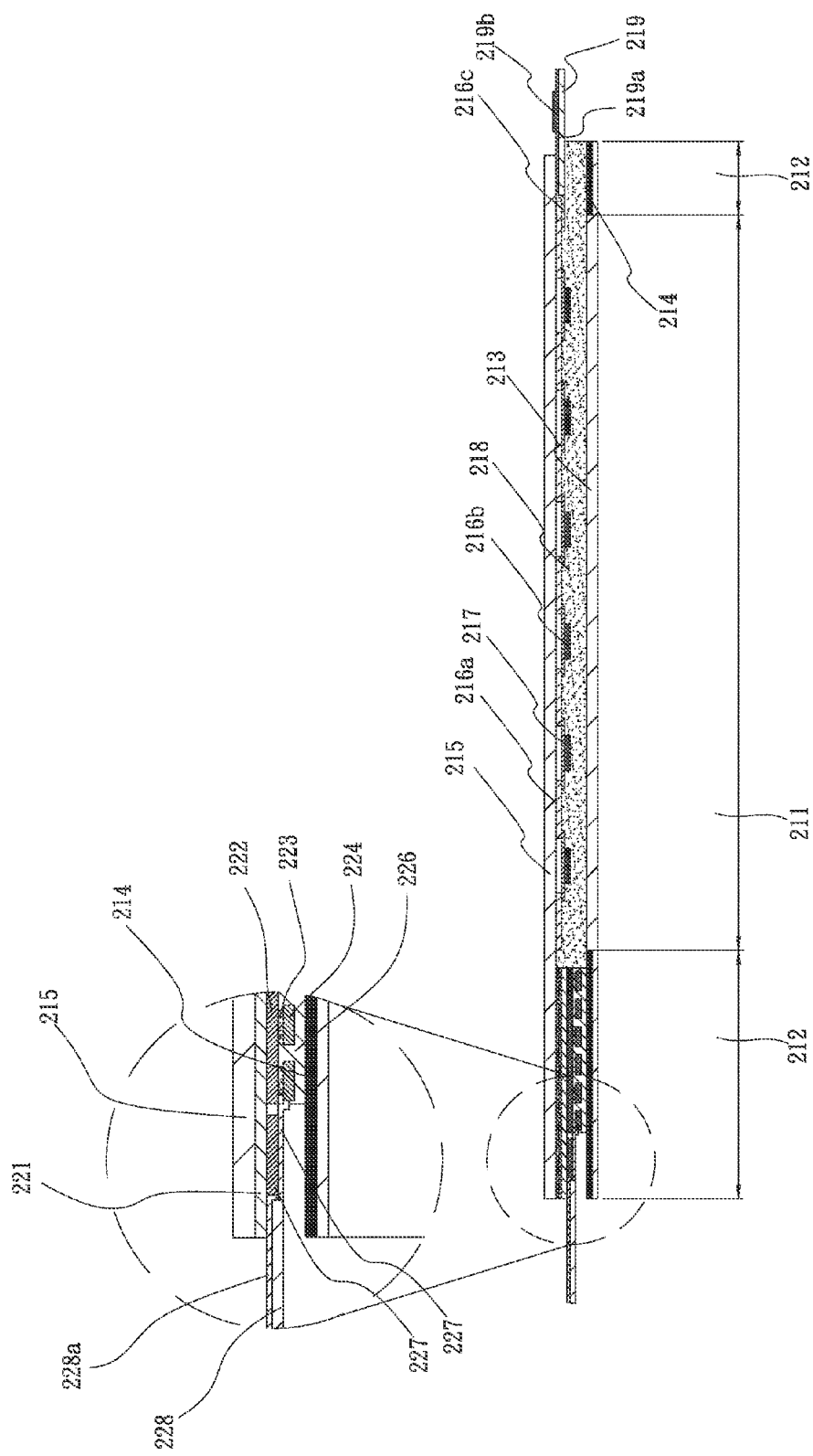

TOUCH DEVICE WITH FINGERPRINT IDENTIFICATION FUNCTION

BACKGROUND OF THE INVENTION

1. Field of the Invention

The present invention relates generally to a touch device with fingerprint identification function, and more particularly to a touch device in which a fingerprint identification unit is directly integrated with and formed on a touch unit to enhance the fingerprint identification precision and lower the manufacturing cost.

2. Description of the Related Art

Along with the rapid advance of multimedia technique, more and more easy portable intelligent electronic devices have been developed and become inevitable implements in our daily life, such as personal digital assistant (PDA), digital camera, personal notebook, tablet or wearable device. These portable electronic devices are quite personalized. Therefore, in case a user misses the portable electronic devices or the portable electronic devices are burglarized, all the data stored in the portable electronic devices, such as telephone book, photos, etc. may be utilized by unauthorized persons to cause unnecessary loss.

Therefore, such product necessitates a certain identity certification and authorization management to ensure the privacy of a user. The currently used identity certification means is mainly password protection. A user needs to first input correct password to the portable electronic device for access to the operation page of the portable electronic device. However, the security of the password protection is lower. This is because the password is likely to leak or break. Moreover, in case the user forgets the password, it will be quite troublesome. Therefore, portable electronic devices with fingerprint identification function for identity certification have been developed and commercially available. Human fingerprints are unique so that the security of the identity certification by fingerprint identification is much higher. In addition, the fingerprint identification for identity certification is relatively convenient to a user. The user can save the troubles of memorization and input of the password.

The existent fingerprint identification system is wisely applied to handheld device or mobile device. The most often seen fingerprint identification device is independently fixedly designed on one side of the keyboard of such as a notebook or a backside or bottom side of one end of the handheld mobile device in a fixed position. The fingerprint identification device can be hardly integrated on the touch screen of the handheld mobile device to minify the volume of the handheld mobile device. Furthermore, the conventional fingerprint identification chip packaging module mainly includes a substrate, chips and packaging body. The chips are disposed on the substrate and electrically connected therewith. The packaging body is overlaid on the surface of the substrate and the chips.

In the conventional technique, it is necessary to first arrange the respective sensation circuits and metal wires or a chip on a substrate made of silicon wafer. These components are integrated to form a fingerprint identification unit. Then, the fingerprint identification unit is connected with the touch panel or other device for use. The total thickness of the conventional fingerprint identification unit is relatively thick. As a result, the thickness will affect the precision of fingerprint identification. Also, in consideration of the thickness, the fingerprint identification unit cannot be integrated with the touch device with thinner thickness.

Furthermore, the chip is coated with multiple layers of films so that the total thickness of the chip packaging module is thicker. Therefore, in general, when a finger touches the sensation section of the chip, the sensitivity of the chip packaging module is lowered.

In addition, the conventional slide-type fingerprint identification system has directionality. Moreover, the identification time is too long. Also, the conventional slide-type fingerprint identification system must be independently arranged. Therefore, the conventional slide-type fingerprint identification system can be hardly integrated with the touch screen and it is inconvenient to use such fingerprint identification system.

SUMMARY OF THE INVENTION

It is therefore a primary object of the present invention to provide a touch device with fingerprint identification function. In the touch device, a fingerprint identification unit is directly integrated with a touch unit.

To achieve the above and other objects, the touch device with fingerprint identification function of the present invention includes a touch unit and a fingerprint identification unit.

The touch unit is defined with a touch section and a non-touch section. The non-touch section is disposed around the touch section in adjacency to the touch section. The touch unit has:

a first substrate having a first surface and a second surface, the first surface being a plane face or a curved face;

a shield layer selectively disposed on the non-touch section of the first surface or the second surface;

a second substrate having a third surface and a fourth surface;

a touch electrode layer disposed on the touch section of the third surface of the second substrate, the touch electrode layer having multiple first touch electrodes and multiple second touch electrodes and multiple metal wires, the first and second touch electrodes being electrically connected with the metal wires;

an optical adhesive layer disposed between the first and second substrates; and a flexible circuit board having multiple circuit wires and a touch chip, the circuit wires being electrically connected with the touch chip and the metal wires, the flexible circuit board being selectively disposed on the third surface or the fourth surface of the second substrate.

The fingerprint identification unit is disposed on the non-touch section of the touch unit.

In the above touch device with fingerprint identification function, the second substrate is selectively made of glass or PET material.

In the above touch device with fingerprint identification function, the fingerprint identification unit further has:

a first coating layer disposed on the non-touch section of the third surface of the second substrate;

a first fingerprint identification electrode layer laminated and overlaid on the first coating layer, the first fingerprint identification electrode layer having multiple first fingerprint identification electrodes;

a first protection layer overlaid on a part of the first fingerprint identification electrode layer;

a second fingerprint identification electrode layer disposed on one face of the first protection layer distal from the first fingerprint identification electrode layer, the second fingerprint identification electrode layer having multiple second fingerprint identification electrodes;

a second protection layer overlaid on a part of the second fingerprint identification electrode layer;

a lead layer having multiple metal leads, the metal leads being selectively connected with the first and second fingerprint identification electrode layers;

a fingerprint identification chip disposed on the non-touch section of the third surface of the second substrate; and a flexible circuit board having multiple electronic circuits connected with the first and second fingerprint identification electrode layers and the lead layer and the fingerprint identification chip, the flexible circuit board being selectively disposed on the non-touch section of the third surface or the fourth surface of the second substrate.

In the above touch device with fingerprint identification function, the fingerprint identification unit further has:

a first coating layer disposed on the non-touch section of the third surface of the second substrate;

a first fingerprint identification electrode layer laminated and overlaid on the first coating layer, the first fingerprint identification electrode layer having multiple first fingerprint identification electrodes;

a first protection layer overlaid on a part of the first fingerprint identification electrode layer;

a second fingerprint identification electrode layer disposed on one face of the first protection layer distal from the first fingerprint identification electrode layer, the second fingerprint identification electrode layer having multiple second fingerprint identification electrodes;

a second protection layer overlaid on a part of the second fingerprint identification electrode layer;

a lead layer having multiple metal leads, the metal leads being selectively connected with the first and second fingerprint identification electrode layers;

a fingerprint identification chip disposed on the non-touch section of the third surface of the second substrate; and a flexible circuit board having multiple electronic circuits connected with the first and second fingerprint identification electrode layers and the lead layer and the fingerprint identification chip.

In the above touch device with fingerprint identification function, the first and second protection layers are over-coat (OC) protection films or silicon dioxide films.

In the above touch device with fingerprint identification function, the first, second and third coating layers are silicon dioxide films.

According to the present invention, the fingerprint identification unit is directly integrated with the touch unit and disposed in the non-touch section thereof. Therefore, it is unnecessary to additionally form a perforation or a channel on the touch device for arranging the fingerprint identification unit. In this case, the structural strength of the touch device will not be deteriorated. Also, the manufacturing cost can be lowered.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 4 is a sectional assembled view of the second embodiment of the touch device with fingerprint identification function of the present invention.

DETAILED DESCRIPTION OF THE PREFERRED EMBODIMENTS

Figure 1:
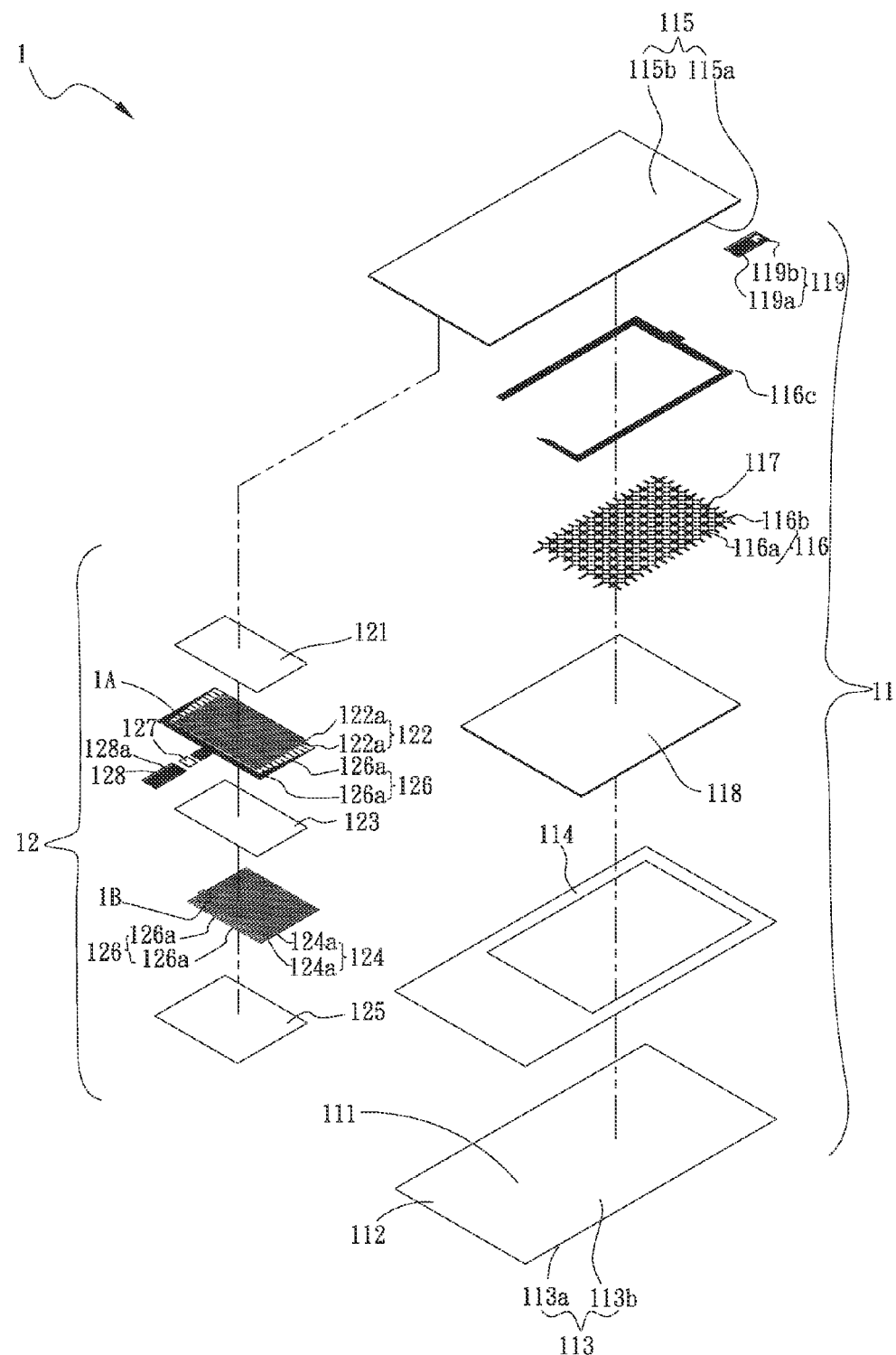
FIG. 1 is a perspective exploded view of a first embodiment of the touch device with fingerprint identification function of the present invention.
Figure 1A:
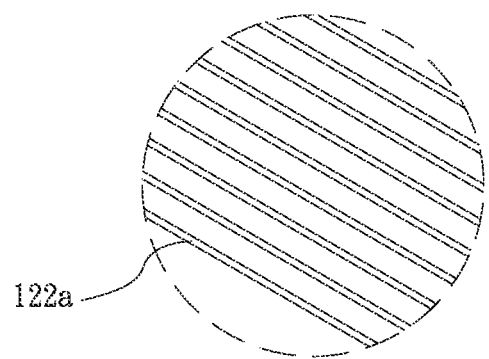
FIG. 1A is an enlarged view of a part of the first embodiment of the touch device with fingerprint identification function of the present invention.
Figure 1B:
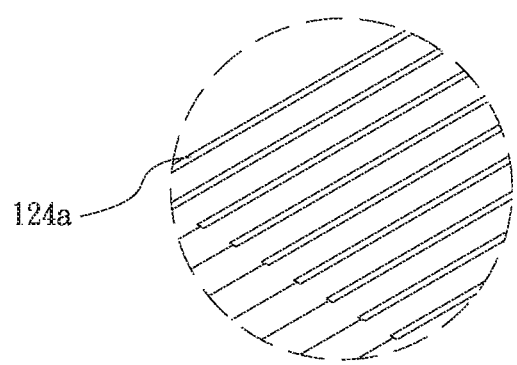
FIG. 1B is an enlarged view of another part of the first embodiment of the touch device with fingerprint identification function of the present invention.
Figure 2:
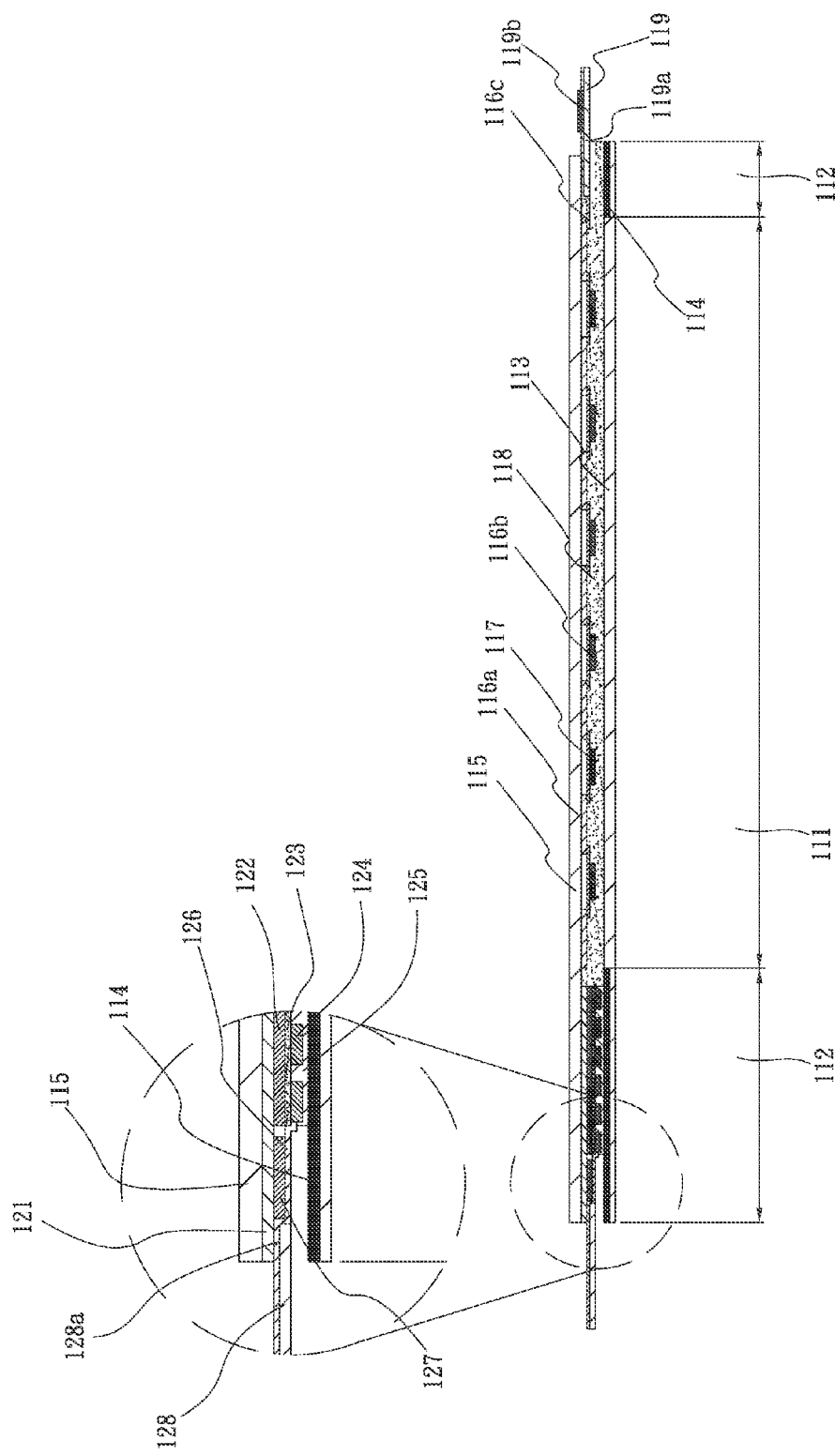
FIG. 2 is a sectional assembled view of the first embodiment of the touch device with fingerprint identification function of the present invention.

Please refer to FIGS. 1, 1A, 1B and 2. FIG. 1 is a perspective exploded view of a first embodiment of the touch device with fingerprint identification function of the present invention. FIG. 1A is an enlarged view of a part of the first embodiment of the touch device with fingerprint identification function of the present invention. FIG. 1B is an enlarged view of another part of the first embodiment of the touch device with fingerprint identification function of the present invention. FIG. 2 is a sectional assembled view of the first embodiment of the touch device with fingerprint identification function of the present invention. As shown in the drawings, the touch device 1 with fingerprint identification function of the present invention includes a touch unit 11 and a fingerprint identification unit 12.

The touch unit 11 is defined with a touch section 111 and a non-touch section 112. The non-touch section 112 is disposed around the touch section 111 in adjacency to the touch section 111. The fingerprint identification unit 12 is disposed on the non-touch section 112.

The touch unit 11 has a first substrate 113, a shield layer 114, a second substrate 115, a touch electrode layer 116, an insulation layer 117, an optical adhesive layer 118 and a flexible circuit board 119.

The first substrate 113 has a first surface 113a and a second surface 113b. The first surface 113a can be a plane face or a curved face. In the case of a curved face, the first surface 113a can be entirely a curved face or only four sides of the first surface 113a are curved (not shown).

The shield layer 114 is selectively disposed on the non-touch section 112 of the first surface 113a or the second surface 113b. In this embodiment, the shield layer 114 is, but not limited to, disposed on the non-touch section 112 of the second surface 113b for illustration purposes only. The shield layer 114 is a layer of black insulation ink.

The second substrate 115 has a third surface 115a and a fourth surface 115b. The touch electrode layer 116 is disposed on the touch section 111 of the third surface 115a of the second substrate 115. The touch electrode layer 116 has multiple first touch electrodes 116a and multiple second touch electrodes 116b and multiple metal wires 116c. The first and second touch electrodes 116a, 116b are electrically connected with the metal wires 116c. The metal wires 116c partially extend to the non-touch section 112. The insulation layer 117 is disposed at the intersections between the first and second touch electrodes 116a, 116b. The second substrate 115 is selectively made of glass or PET material. In this embodiment, the second substrate 115 is, but not limited to, made of glass.

The optical adhesive layer 118 is disposed between the first and second substrates 113, 115 to cover the touch electrode layer 116.

The flexible circuit board 119 has multiple circuit wires 119a and a touch chip 119b. The circuit wires 119a are electrically connected with the touch chip 119b and the metal wires 116c. The flexible circuit board 119 is selectively disposed on the third surface 115a or the fourth surface 115b of the second substrate 115.

The fingerprint identification unit 12 is disposed on the non-touch section 112 of the touch unit 11.

The fingerprint identification unit 12 further has a first coating layer 121, a first fingerprint identification electrode layer 122, a first protection layer 123, a second fingerprint identification electrode layer 124, a second protection layer 125, a lead layer 126, a fingerprint identification chip 127 and a flexible circuit board 128.

The first coating layer 121 is disposed on the non-touch section 112 of the third surface 115a of the second substrate 115. The first fingerprint identification electrode layer 122 is laminated and overlaid on the first coating layer 121. The first fingerprint identification electrode layer 122 has multiple first fingerprint identification electrodes 122a. The first protection layer 123 is overlaid on a part of the first fingerprint identification electrode layer 122. The second fingerprint identification electrode layer 124 is disposed on one face of the first protection layer 123 distal from the first fingerprint identification electrode layer 122. The second fingerprint identification electrode layer 124 has multiple second fingerprint identification electrodes 124a. The second protection layer 125 is overlaid on a part of the second fingerprint identification electrode layer 124. The lead layer 126 has multiple metal leads 126a. The metal leads 126a are selectively connected with the first and second fingerprint identification electrode layers 122, 124. The fingerprint identification chip 127 is selectively disposed on the non-touch section 112 of the third surface 115a or the fourth surface 115b of the second substrate 115. In this embodiment, the fingerprint identification chip 127 is, but not limited to, disposed on the non-touch section 112 of the third surface 115a for illustration purposes only. The flexible circuit board 128 has multiple electronic circuits 128a connected with the first and second fingerprint identification electrode layers 122, 124 and the lead layer 126 and the fingerprint identification chip 127. The flexible circuit board 128 is selectively disposed on the non-touch section 112 of the third surface 115a or the fourth surface 115b of the second substrate 115. In this embodiment, the flexible circuit board 128 is, but not limited to, disposed on the non-touch section 112 of the third surface 115a corresponding to the fingerprint identification chip 127 for illustration purposes only.

Figure 3:
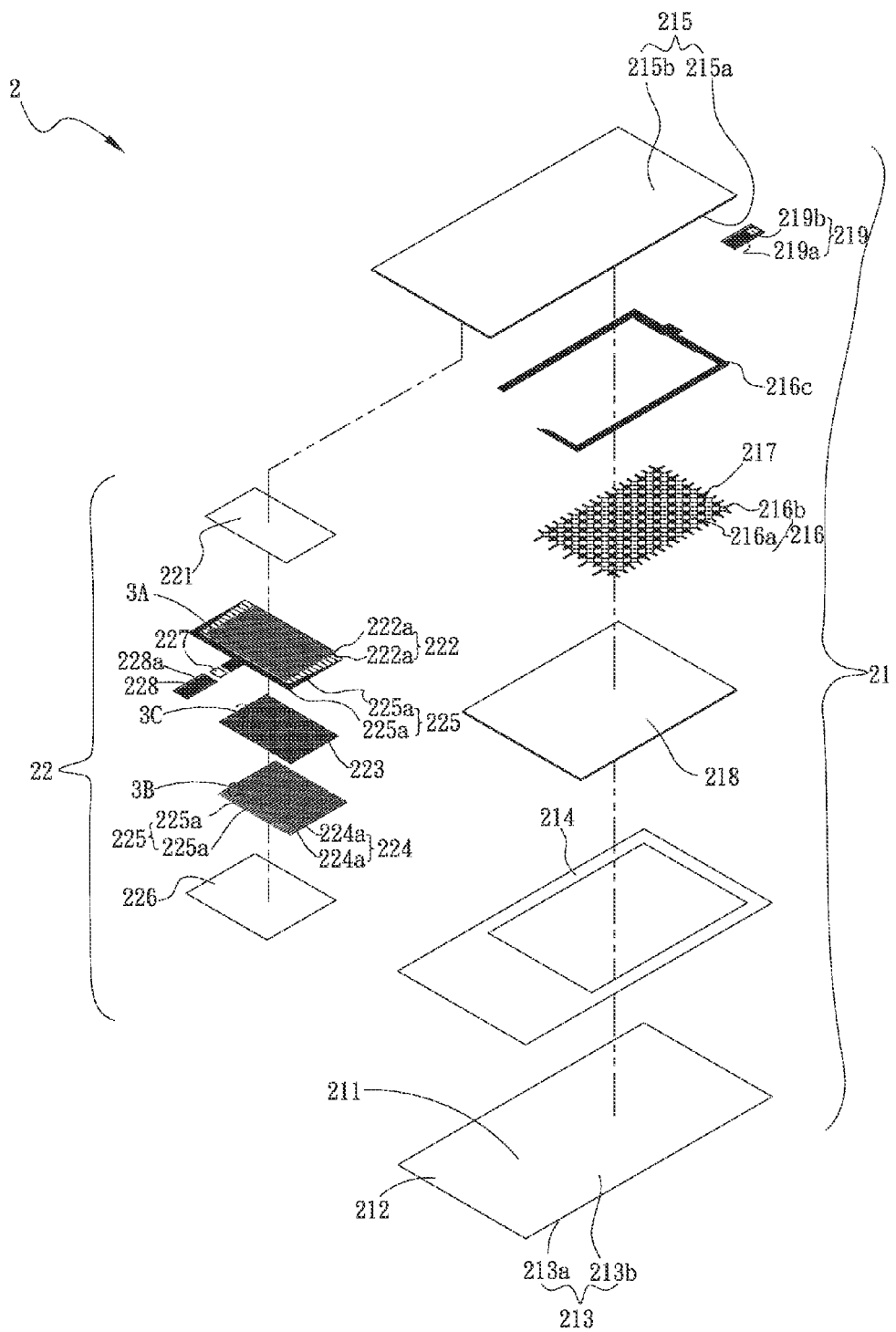
FIG. 3 is a perspective exploded view of a second embodiment of the touch device with fingerprint identification function of the present invention.
Figure 3A:
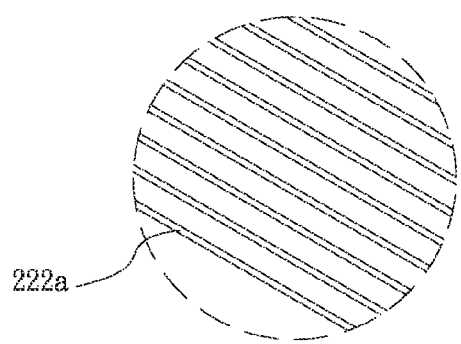
FIG. 3A is an enlarged view of a part of the second embodiment of the touch device with fingerprint identification function of the present invention.
Figure 3B:
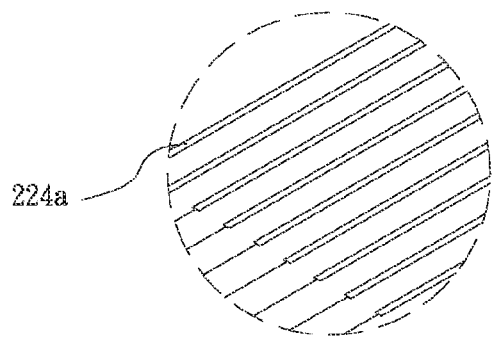
FIG. 3B is an enlarged view of another part of the second embodiment of the touch device with fingerprint identification function of the present invention.
Figure 3C:
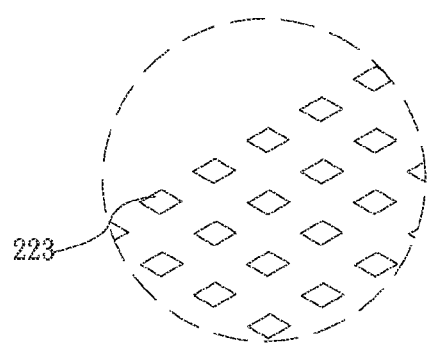
FIG. 3C is an enlarged view of still another part of the second embodiment of the touch device with fingerprint identification function of the present invention.

Please refer to FIGS. 3, 3A, 3B, 3C and 4. FIG. 3 is a perspective exploded view of a second embodiment of the touch device with fingerprint identification function of the present invention. FIG. 3A is an enlarged view of a part of the second embodiment of the touch device with fingerprint identification function of the present invention. FIG. 3B is an enlarged view of another part of the second embodiment of the touch device with fingerprint identification function of the present invention. FIG. 3C is an enlarged view of still another part of the second embodiment of the touch device with fingerprint identification function of the present invention. FIG. 4 is a sectional assembled view of the second embodiment of the touch device with fingerprint identification function of the present invention. As shown in the drawings, the touch device 2 with fingerprint identification function of the present invention includes a touch unit 21 and a fingerprint identification unit 22.

The touch unit 21 is defined with a touch section 211 and a non-touch section 212. The non-touch section 212 is disposed around the touch section 211 in adjacency to the touch section 211. The fingerprint identification unit 22 is disposed on the non-touch section 212.

The touch unit 21 has a first substrate 213, a shield layer 214, a second substrate 215, a touch electrode layer 216, an insulation layer 217, an optical adhesive layer 218 and a flexible circuit board 219.

The first substrate 213 has a first surface 2113a and a second surface 213b. The first surface 213a can be a plane face or a curved face.

The shield layer 214 is selectively disposed on the non-touch section 212 of the first surface 213a or the second surface 213b. In this embodiment, the shield layer 214 is, but not limited to, disposed on the non-touch section 212 of the second surface 213b for illustration purposes only.

The second substrate 215 has a third surface 215a and a fourth surface 215b. The touch electrode layer 216 is disposed on the touch section 211 of the third surface 215a of the second substrate 215. The touch electrode layer 216 has multiple first touch electrodes 216a and multiple second touch electrodes 216b and multiple metal wires 216c. The first and second touch electrodes 216a, 216b are electrically connected with the metal wires 216c. The metal wires 216c partially extend to the non-touch section 112. The insulation layer 217 is disposed at the intersections between the first and second touch electrodes 216a, 216b. The second substrate 215 is selectively made of glass or PET material. In this embodiment, the second substrate 215 is, but not limited to, made of glass.

The optical adhesive layer 218 is disposed between the first and second substrates 213, 215 to cover the touch electrode layer 216.

The flexible circuit board 219 has multiple circuit wires 219a and a touch chip 219b. The circuit wires 219a are electrically connected with the touch chip 219b and the metal wires 216c. The flexible circuit board 219 is selectively disposed on the non-touch section 212 of the third surface 215a or the fourth surface 215b of the second substrate 215. In this embodiment, the flexible circuit board 219 is, but not limited to, disposed on the non-touch section 212 of the third surface 215a for illustration purposes only.

The fingerprint identification unit 22 is disposed on the non-touch section 212 of the touch unit 21.

The fingerprint identification unit 22 further has a first coating layer 221, a first fingerprint identification electrode layer 222, a second coating layer 223, a second fingerprint identification electrode layer 224, a lead layer 225, a third coating layer 226, a fingerprint identification chip 227 and a flexible circuit board 228.

The first coating layer 221 is disposed on the non-touch section 212 of the third surface 215a of the second substrate 215. The first fingerprint identification electrode layer 222 is laminated and overlaid on the first coating layer 221. The first fingerprint identification electrode layer 222 has multiple first fingerprint identification electrodes 222a. The second coating layer 223 is overlaid on a part of the first fingerprint identification electrode layer 222.

The second fingerprint identification electrode layer 224 is disposed on one face of the second coating layer 223 distal from the first fingerprint identification electrode layer 222. The second fingerprint identification electrode layer 224 has multiple second fingerprint identification electrodes 224a. The lead layer 225 has multiple metal leads 225a. The metal leads 225a are selectively connected with the first and second fingerprint identification electrode layers 222, 224. The third coating layer 226 is overlaid on the second fingerprint identification electrode layer 224 and a part of the lead layer 225.

The fingerprint identification chip 227 is selectively disposed on the non-touch section 112 of the third surface 215a or the fourth surface 215b of the second substrate 215. In this embodiment, the fingerprint identification chip 227 is, but not limited to, disposed on the non-touch section 212 of the third surface 215a for illustration purposes only. The flexible circuit board 228 has multiple electronic circuits 228a electrically connected with the first and second fingerprint identification electrode layers 222, 224 and the lead layer 225 and the fingerprint identification chip 227. The flexible circuit board 228 is selectively disposed on the non-touch section 212 of the third surface 215a or the fourth surface 215b of the second substrate 215. In this embodiment, the flexible circuit board 228 is, but not limited to, disposed on the non-touch section 212 of the third surface 215a corresponding to the fingerprint identification chip 227 for illustration purposes only.

The first and second protection layers 123, 125 are over-coat (OC) protection films or silicon dioxide films. The first, second and third coating layers 121, 221, 223, 226 are silicon dioxide films.

According to the present invention, the fingerprint identification unit is directly integrated with the touch unit and disposed in the non-touch section thereof. In addition, the fingerprint identification unit is disposed in the non-touch section of the touch unit by means of direct layout. Therefore, it is unnecessary to additionally form a perforation or a channel on the touch device for arranging the fingerprint identification unit. In this case, the structural strength of the touch device will not be deteriorated. Also, the manufacturing cost can be lowered.

The present invention has been described with the above embodiments thereof and it is understood that many changes and modifications in the above embodiments can be carried out without departing from the scope and the spirit of the invention that is intended to be limited only by the appended claims.

What is claimed is:

1. A touch device with fingerprint identification function, comprising:
   a touch unit defined with a touch section and a non-touch section, the non-touch section being disposed around the touch section in adjacency to the touch section, the touch unit having:
   a first substrate having a first surface and a second surface without any perforation or channel formed therein, the first surface being a plane face or a curved face;
   a shield layer selectively disposed on the non-touch section of the first surface or the second surface;
   a second substrate having a third surface and a fourth surface;
   a touch electrode layer disposed on the touch section of the third surface of the second substrate, the touch electrode layer having multiple first touch electrodes and multiple second touch electrodes and multiple metal wires, the first and second touch electrodes being electrically connected with the metal wires;
   an optical adhesive layer disposed between the first and second substrates; and
   a flexible circuit board having multiple circuit wires and a touch chip, the circuit wires being electrically connected with the touch chip and the metal wires, the flexible circuit board being selectively disposed on the third surface or the fourth surface of the second substrate; and
   a fingerprint identification unit disposed on the non-touch section of the touch unit by means of direct layout; wherein the fingerprint identification unit further has:
   a first coating layer disposed on the non-touch section of the third surface of the second substrate;
   a first fingerprint identification electrode layer laminated and overlaid on the first coating layer, the first fingerprint identification electrode layer having multiple first fingerprint identification electrodes;
   a first protection layer overlaid on a part of the first fingerprint identification electrode layer;
   a second fingerprint identification electrode layer disposed on one face of the first protection layer distal from the first fingerprint identification electrode layer, the second fingerprint identification electrode layer having multiple second fingerprint identification electrodes;
   a second protection layer overlaid on a part of the second fingerprint identification electrode layer;
   a lead layer having multiple metal leads, the metal leads being selectively connected with the first and second fingerprint identification electrode layers;
   a fingerprint identification chip selectively disposed on the non-touch section of the third surface or the fourth surface of the second substrate; and
   a flexible circuit board having multiple electronic circuits connected with the first and second fingerprint identification electrode layers and the lead layer and the fingerprint identification chip, the flexible circuit board being selectively disposed on the third surface or the fourth surface of the second substrate; and
   wherein the first and second protection layers are over-coat (OC) protection films or silicon dioxide films.

2. The touch device with fingerprint identification function as claimed in claim 1, wherein the second substrate is selectively made of glass or PET material.

3. A touch device with fingerprint identification function, comprising:
   a touch unit defined with a touch section and a non-touch section, the non-touch section being disposed around the touch section in adjacency to the touch section, the touch unit having:
   a first substrate having a first surface and a second surface without any perforation or channel formed therein, the first surface being a plane face or a curved face;
   a shield layer selectively disposed on the non-touch section of the first surface or the second surface;
   a second substrate having a third surface and a fourth surface;
   a touch electrode layer disposed on the touch section of the third surface of the second substrate; the touch electrode layer having multiple first touch electrodes and multiple second touch electrodes and multiple metal wires, the first and second touch electrodes being electrically connected with the metal wires;
   an optical adhesive layer disposed between the first and second substrate; and a flexible circuit board having multiple circuit wires and a touch chip, the circuit wires being electrically connected with the touch chip and metal wires, the flexible circuit board being selectively disposed on the third surface or the fourth surface of the second substrate; and a fingerprint identification unit disposed on the non-touch section of the touch unit by means of direct layout; wherein the fingerprint identification unit further has:

a first coating layer disposed on the non-touch section of the third surface of the second substrate;

a first fingerprint identification electrode layer laminated and overlaid on the first coating layer, the first fingerprint identification electrode layer having multiple first fingerprint identification electrodes;

a second coating layer overlaid on a part of the first fingerprint identification electrode layer;

a second fingerprint identification electrode layer disposed on one face of the second coating layer distal from the first fingerprint identification electrode layer, the second fingerprint identification electrode layer having multiple second fingerprint identification electrodes;

a lead layer having multiple metal leads, the metal leads being selectively connected with the first and second fingerprint identification electrode layers;

a third coating layer overlaid on the second fingerprint identification electrode layer and a part of the lead layer;

a fingerprint identification chip disposed on the non-touch section of the third surface or the fourth surface of the second substrate; and a flexible circuit board having multiple electrode circuits connected with the first and second fingerprint identification electrode layers and the lead layer and the fingerprint chip, the flexible circuit board being selectively disposed on the third surface or the fourth surface of the second substrate; and wherein the first, second and third coating layers are silicon dioxide films.

* * * * *